(12) United States Patent
Kunze et al.

(10) Patent No.: US 7,725,886 B2
(45) Date of Patent: May 25, 2010

(54) MERGER OF TABLES STORING PROTOCOL DATA UNIT RELATED DATA

(75) Inventors: Aaron R. Kunze, Portland, OR (US); Erik J. Johnson, Portland, OR (US); James L. Jason, Hillsboro, OR (US); Harrick M. Vin, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1310 days.

(21) Appl. No.: 10/405,787

(22) Filed: Apr. 1, 2003

(65) Prior Publication Data

US 2004/0196845 A1 Oct. 7, 2004

(51) Int. Cl.
*G06F 9/45* (2006.01)
(52) U.S. Cl. .................................................. 717/159
(58) Field of Classification Search ......... 717/107–145, 717/159; 709/201, 217, 227, 233, 239, 250, 709/224; 370/352, 340, 392, 395.1, 469; 455/452.2; 711/167
See application file for complete search history.

(56) References Cited

U.S. PATENT DOCUMENTS

| 5,963,932 | A  | * | 10/1999 | Jakobsson et al. ............... 707/2 |
| 6,279,035 | B1 | * | 8/2001  | Brown et al. ................. 709/224 |
| 6,581,205 | B1 | * | 6/2003  | Cochrane et al. ............. 717/140 |
| 6,781,994 | B1 | * | 8/2004  | Nogami et al. ............ 370/395.1 |
| 7,006,497 | B2 | * | 2/2006  | Dove et al. ................... 370/390 |
| 7,146,478 | B2 | * | 12/2006 | Herkerdorf et al. .......... 711/167 |
| 2001/0056490 | A1 | * | 12/2001 | Nagami et al. ............... 709/227 |

OTHER PUBLICATIONS

Sharaf et al, 'Semantic-Based Delivery of OLAP Summary Tables in Wireless Environments', 2002, CIKM'02, pp. 1-9.*
Calvert et al, 'Building a Programmable Multiplexing Service Using Concast', DARPA, IEEE 2000, pp. 230-239.*

* cited by examiner

*Primary Examiner*—Tuan Anh Vu
(74) *Attorney, Agent, or Firm*—Kacvinsky LLC

(57) ABSTRACT

In general, in one aspect, the disclosure describes a method of determining if a first query for data related to a protocol data unit in a first table is a query to a table merged into a combination table formed from multiple tables. If so, the method can generate a second query for the first query for data stored by the combination table.

18 Claims, 4 Drawing Sheets

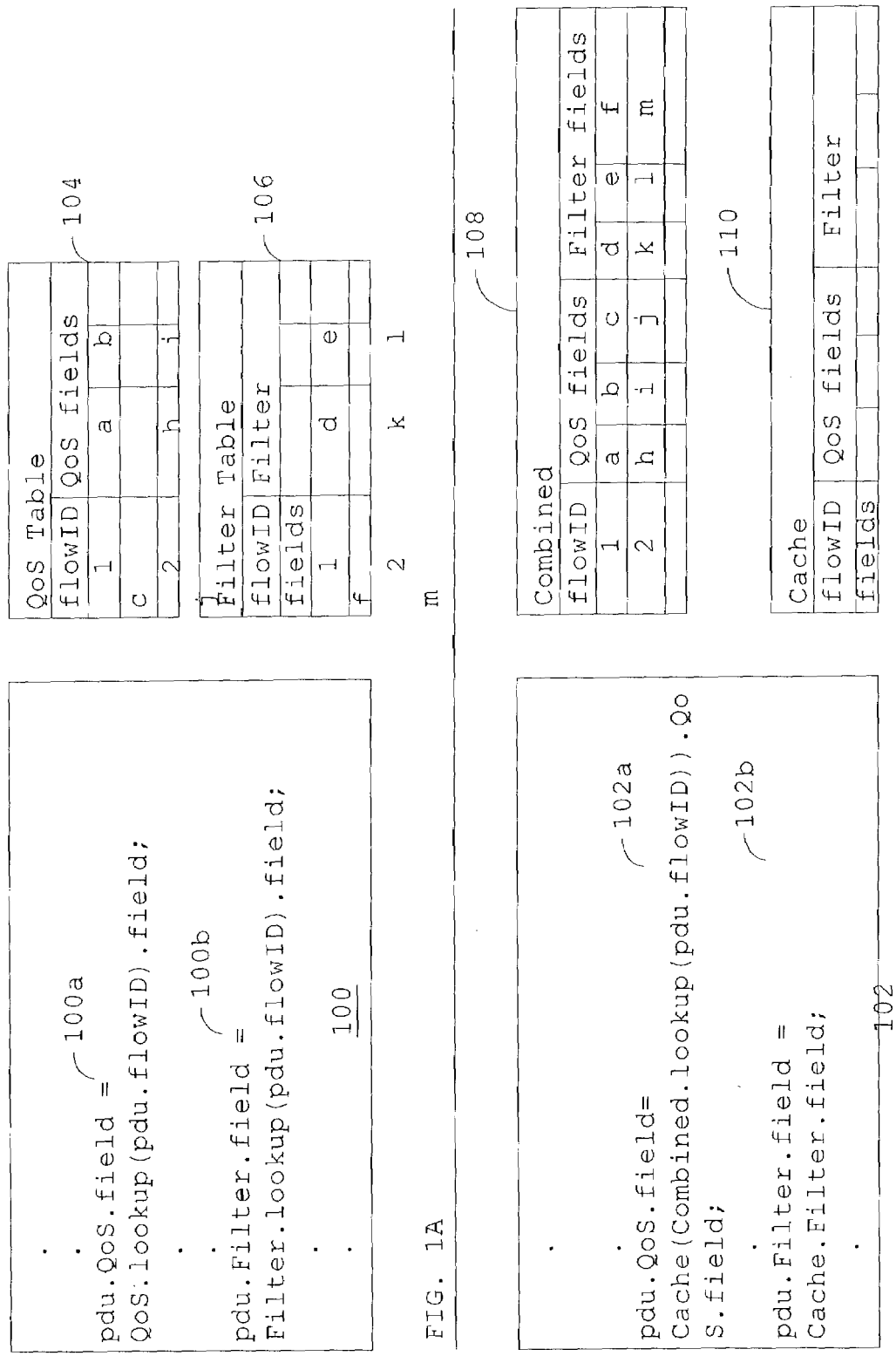

MERGER OF TABLES STORING PROTOCOL DATA UNIT RELATED DATA

BACKGROUND

Networks enable computers and other devices to communicate. For example, networks can carry data representing video, audio, e-mail, and so forth. Typically, data sent across a network is divided into smaller messages known as Protocol Data Units (PDUs). By analogy, a PDU is much like an envelope you drop in a mailbox. The letter inside the envelope is like the PDUs "payload" while the envelope itself is like the "header" information added to the payload to help network devices handle the PDU appropriately. A given PDU may "hop" across many different intermediate network devices, known as "routers" or "bridges", before reaching its destination.

Devices vary in the way they process PDUs based on the networking technology being used and the role the device plays within a networking scheme. For example, routers often perform operations that include PDU classification and forwarding. For instance, based on a Quality of Service (QoS) classification, a router may forward a given IP datagram ahead of datagrams with lesser priority.

Many PDU processing operations may be handled by software. To program these operations, programmers can write source code in a computer language. For example, a "C" programmer may write an instruction of:

PDU.TimeToLive=PDU.TimeToLive−1;

to decrement a "TimeToLive" counter that limits how many "hops" a PDU may make before expiring. While a person can intuitively understand the source code, ultimately, the source code must be translated into the more cryptic instructions that a processor executes.

A tool known as a compiler can handle the task of translating instructions written in a source language into instructions for a target instruction set. For example, a programmer can use a compiler to translate the source code above into processor executable instructions. A compilation process can also "preprocess" source code by replacing source code instructions with other source code instructions.

BRIEF DESCRIPTION OF THE DRAWINGS

FIG. 1 is a diagram illustrating operation of a compiler that replaces source code queries to multiple tables with queries for data stored in a single table.

DETAILED DESCRIPTION

Figure 2A:
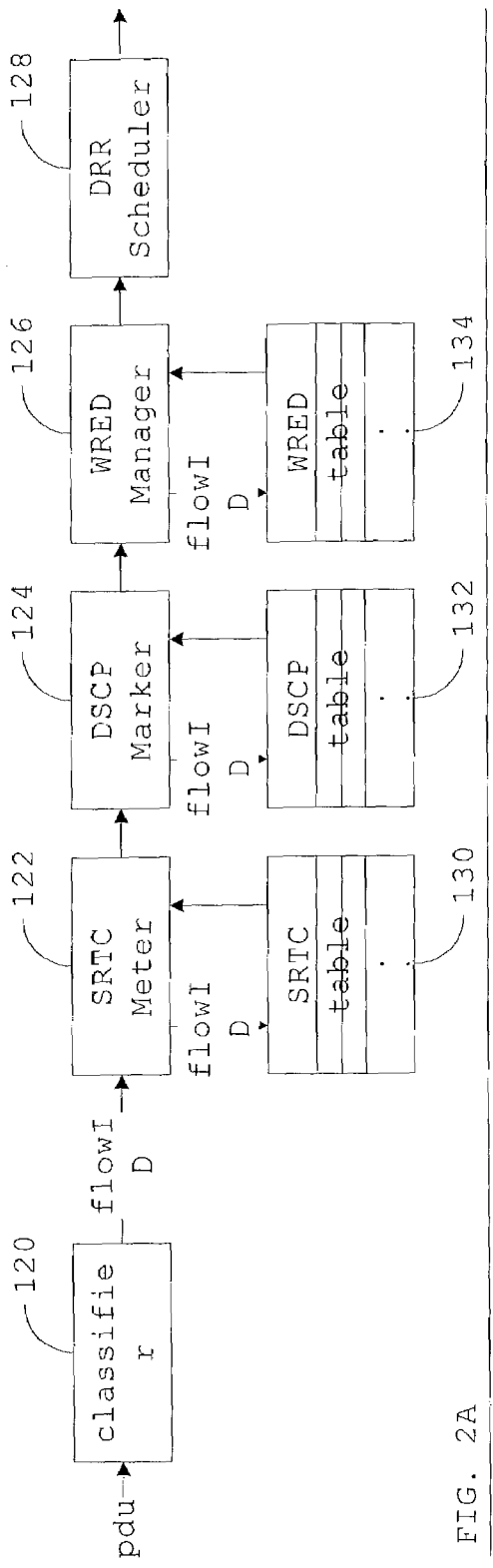
FIGS. 2A and 2B illustrate operation of a pipeline that processes protocol data units.

Protocol data unit (PDU) processing often involves a variety of table queries. For example, FIG. 1A illustrates source code 100 that specifies a series of table 104, 106 queries 100a, 100b to perform when processing a PDU. As shown, after receiving a PDU, a first query 100a may search a table 104 for Quality of Service (QoS) data (e.g., priority, allocated bandwidth, and so forth) to use for the PDU while a second query 100b may search a table 106 storing data that encodes rules for filtering certain PDUs. Often the same key is used for these different queries. For instance, the "flow" of a given PDU may be used to search the QoS 104 and Filtering 106 tables. Generally speaking, a table lookup can be a relatively time consuming operation. As network communication speeds and traffic continue to increase, every processing cycle becomes a valuable commodity.

This disclosure describes techniques that can potentially speed retrieval of PDU-related data by merging tables accessed by different table queries. The resulting, monolithic table associates a lookup key (e.g., an identifier of a PDU's flow) with data aggregated from the previously independent tables. Potentially, a cache (e.g., high-speed memory or a collection of registers) may store the results of a query to the merged table. After initial retrieval from the merged table, the PDU-related data can be quickly retrieved from the cache as needed. The net effect of this approach is to reduce a series of resource consuming table queries with a single query of the merged table and several fast cache accesses.

The techniques described above can be implemented in a variety of ways. For example, FIGS. 1A and 1B illustrate operation of a compiler on source code 100 written to perform PDU processing. In the example shown in FIG. 1A, the source code 100 includes instructions 100a, 100b that query tables 104, 106 using the same key value ("pdu.flowID"). For example, the key value may be derived from the contents of the PDU such as a flow identified by a concatenation of the destination address and source address of an IP datagram's header with the destination port and source port included in a TCP segment header encapsulated by the IP datagram. Alternate, queries for PDU related data may be keyed by the PDU's destination address, ingress port or interface, egress port or interface, channel, or payload (e.g., a (Universal Resource Indicator) URI embedded in a TCP/IP PDU).

In this example, the source code 100 is written in a language that provides a "table" data structure such as an object-oriented "table" class. The class can provide a "lookup" method to lookup a key value, an "add" method to add data to the table, and a "delete" method to delete data from the table. The lookup performed may vary based on table organization and supported search methods. For example, a table lookup may perform an exact match search of an array, a hash table lookup, a longest prefix match table lookup, and so forth.

FIG. 1B represents an example of results of compiler preprocessing of the source code 100 of FIG. 1A. In the example shown, compiler analysis of the source code 100 identified tables 104, 106 as tables to be merged into a combined table 108. After the merger, a "tuple" (a.k.a. table "row") in the combined table 108 associates a particular lookup key with the data for that key in both table 104 and table 106. The compiler can also generate instructions that replace queries 100a, 100b to tables 104, 106 with queries to combined table 108 or a cache 106 of data retrieved from table 108. As an example, after determining query 100a (FIG. 1A) is of a table 104 merged into table 108 (FIG. 1B), the compiler can generate replacement query instructions 102a, 102b that take advantage of the merging. If the query 100a represents a first access to tables 104 and 108 for a PDU, the replacement code 102a can query the combined table 108 and cache 110 the retrieved data. For subsequent queries 100b during processing of the PDU, the compiler can generate instructions 102b that access the cache 110 instead of the combined table 108.

For illustration purposes, FIG. 1B shows compiler generated source code instructions 102. While such instructions 102 may be valuable to a programmer in debugging, the compiler may not generate source code 102 "revisions", but may instead directly output the corresponding target code (e.g., assembler, object, or processor-executable code). Additionally, while the description above refers to a TCP/IP (Transmission Control Protocol/Internet Protocol) PDU, the techniques described in this disclosure may operate on other types of PDUs such as IP datagram fragments, Asynchronous Transfer Mode (ATM) cells, and Ethernet or Synchronous Optical NETwork (SONET) frames, among others. Further, while FIGS. 1A and 1B illustrated retrieval of QoS and filtering data, other queries may retrieve data used in performing traffic metering, scheduling, policing, marking, and so forth.

The techniques illustrated in FIGS. 1A and 1B may be implemented in a wide variety of ways. For example, instead of being implemented within a compiler, the techniques may be implemented at run-time. For example, a run-time module may dynamically initiate table merger and "intercept" and replace instructions accessing the merged tables and replace them with instructions that query the combined table 108 or cache 110.

Additionally, while FIGS. 1A and 1B illustrated merger of two tables 104, 106, the techniques may aggregate many different tables. For example, FIGS. 2A and 2B illustrate application of these techniques to a software pipeline.

Figure 2B:
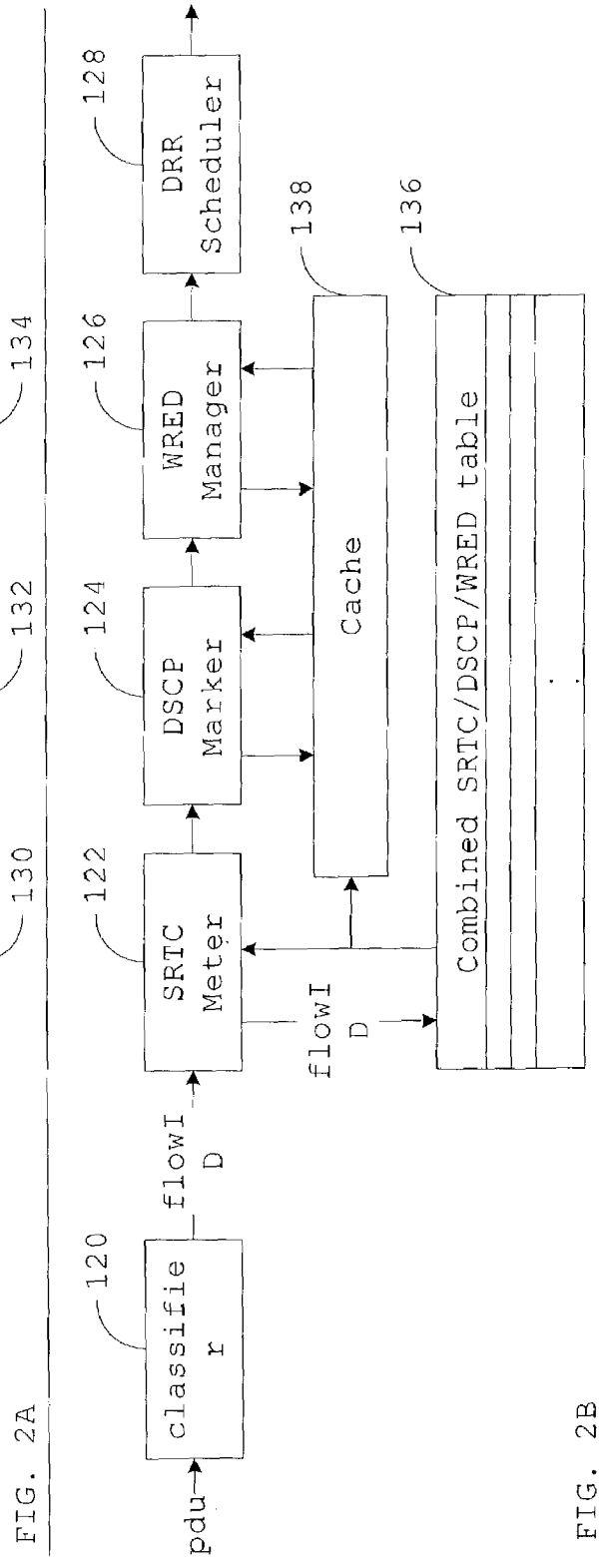

In FIG. 2A the software pipeline features a collection of modules 120-128 that operate on a PDU in succession. These modules include a classifier 120 that generates a flowID value from PDU contents (e.g., PDU header, encapsulated header(s), and/or payload). Subsequent modules 122-128 use this flowID value to lookup PDU related data.

As shown, the sample pipeline includes a Single Rate Three Color (SRTC) meter module 122. Briefly, SRTC meters data transmission for a flow to determine whether data in a flow falls with within a Committed Information Rate, Committed Burst Size, or Excess Burst Size. These different categories are allocated buckets of appropriate size and, like a traffic light, are dubbed "Green", "Yellow", and "Red", respectively. The SRTC module 122 uses the flowID generated by the classifier 120 to lookup data within the SRTC table 130 for the PDU. Such data can include the size of the different buckets, actions to take when a PDU falls within a given bucket, and various metering statistics (e.g., how many "Yellow" PDUs have traveled through the flow).

The pipeline also includes a Differentiated Services Code Point (DSCP) module 124 that marks a PDU for a particular QoS by setting bits in the IP datagram header to a particular value. Downstream devices receiving the datagram can use the value to determine how to handle the PDU (e.g., the "per-hop behavior" (PHB) to apply to the PDU). The module 124 can set the DSCP value of the IP datagram to the value retrieved from the DSCP table 132 for the flowID.

The DSCP module 124 feeds a Weighted Random Early Detect (WRED) module 126 that can selectively drop PDUs when a backlog queue of PDUs awaiting processing threatens to overflow the systems buffering abilities. The module 126 determines whether to drop the current PDU by querying a WRED table 134 for data associated with a flow such as the queue length threshold below which no PDUs will be dropped, the maximum queue length above which all PDUs will be dropped, the slope and intersect of a probability line of the probablility that a PDU will be dropped when the queue length is between thresholds. PDUs that the WRED Manager 126 does not drop are scheduled for forwarding by a Deficit Round Robin (DRR) Scheduler 128.

In the pipeline shown in FIG. 2A, one or more programmers developed modules 122-126 having source code that requests data from three different tables 130-134. As shown in FIG. 2B, performance of the pipeline may be improved by merging the SRTC 130, DSCP 132, and WRED 134 tables by flowID into a monolithic table 136. Thus, source code instructions accessing the individual tables 130-134 can be replaced with instructions accessing the merged table 136 and/or a cache 138 storing data retrieved from the merged table 136.

Figure 3:
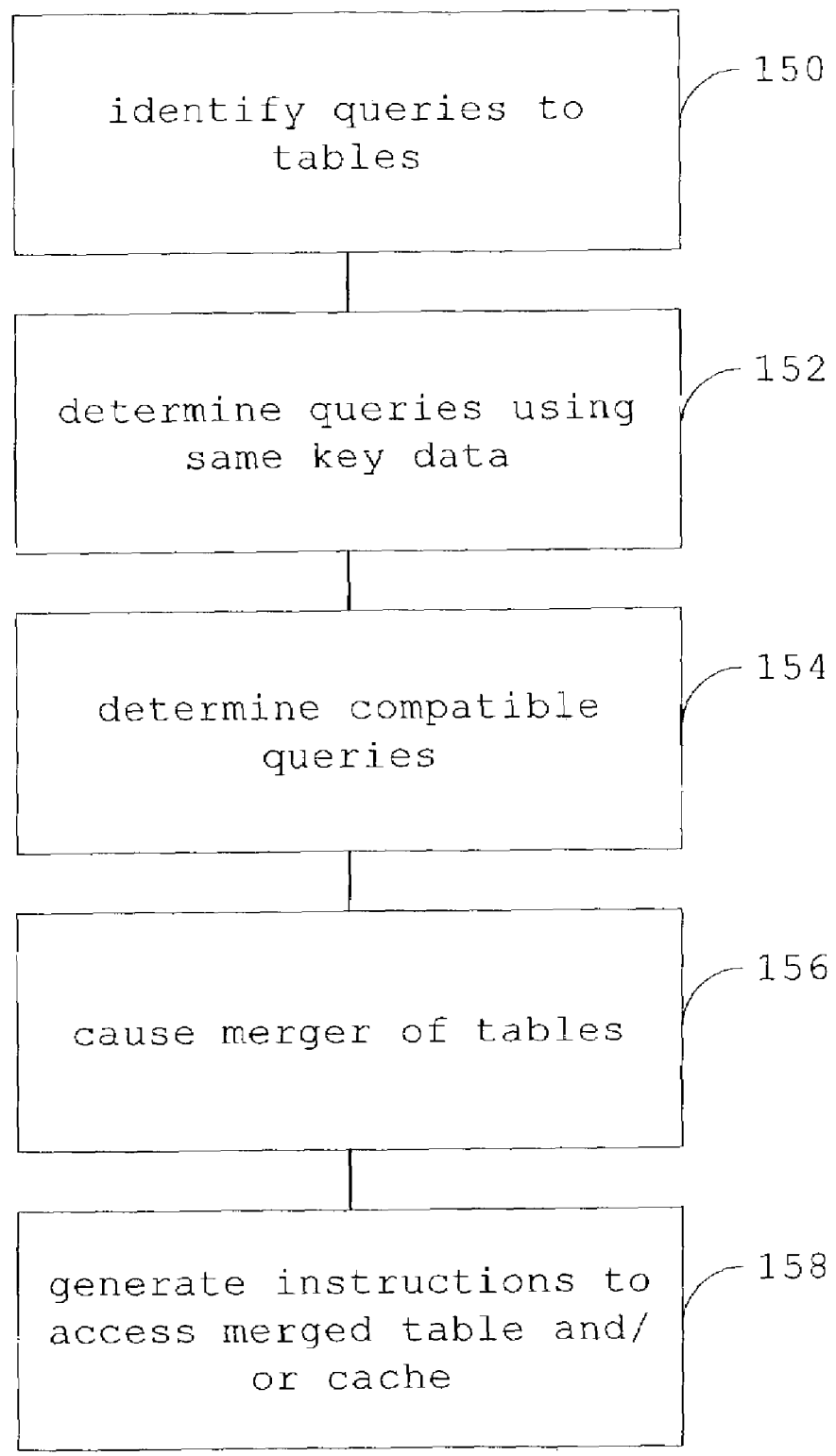
FIG. 3 is a flowchart of a process for accessing data formed from an automatic merger of tables.

FIG. 3 depicts a flowchart implementing techniques described above. As shown, the process identifies table query instructions 150. These instructions identify tables that are candidates for merging. Among these instructions, the process may winnow out those not using the same query key 152. Whether or not different instructions use the same key value may be determined using data flow analysis. For example, different instructions may use the same unchanged variable (e.g., "flowID" in FIGS. 1 and 2) to initiate a lookup. Data flow analysis may identify more complex situations such as when a chain of statements equate variables or identify when differently named variables resolve to the same memory location.

The candidates may be further winnowed using other criteria. For example, the process may ensure that the queries are of compatible types 154. For example, array queries are not compatible with longest prefix match queries because one is an exact match and one is not. However, hash table queries and an array queries are compatible because both are exact match.

Tables accessed by the candidate queries meeting the criteria above can be merged 156. Such merging can be implemented, for example, by generating instructions to perform the merge at run-time or by performing the merge during compilation. The process may then replace the original query instruction(s) with those accessing the merged table. In performing the replacement, the process may attempt to identify the earliest query that should access the merged table, for example, by using code flow analysis (e.g., by determining instruction position within a control flow graph). The earliest query to a table involved in the merger may be replaced with a query to the merged table and instructions that load the cache with data used by subsequent queries even though such data may not be used by the earliest query. The subsequent queries may then be replaced 158 with instructions that access the cache. Instead of trying to identify the earliest query, the process may replace the query with a conditional expression that reads from the merged table and caches the results if the query is the first encountered during processing of a PDU and otherwise reads from the cache.

Potentially, the compiler may alter other instructions. For example, the compiler may ensure that "write" operations to individual tables also reach a combination table.

Figure 4:
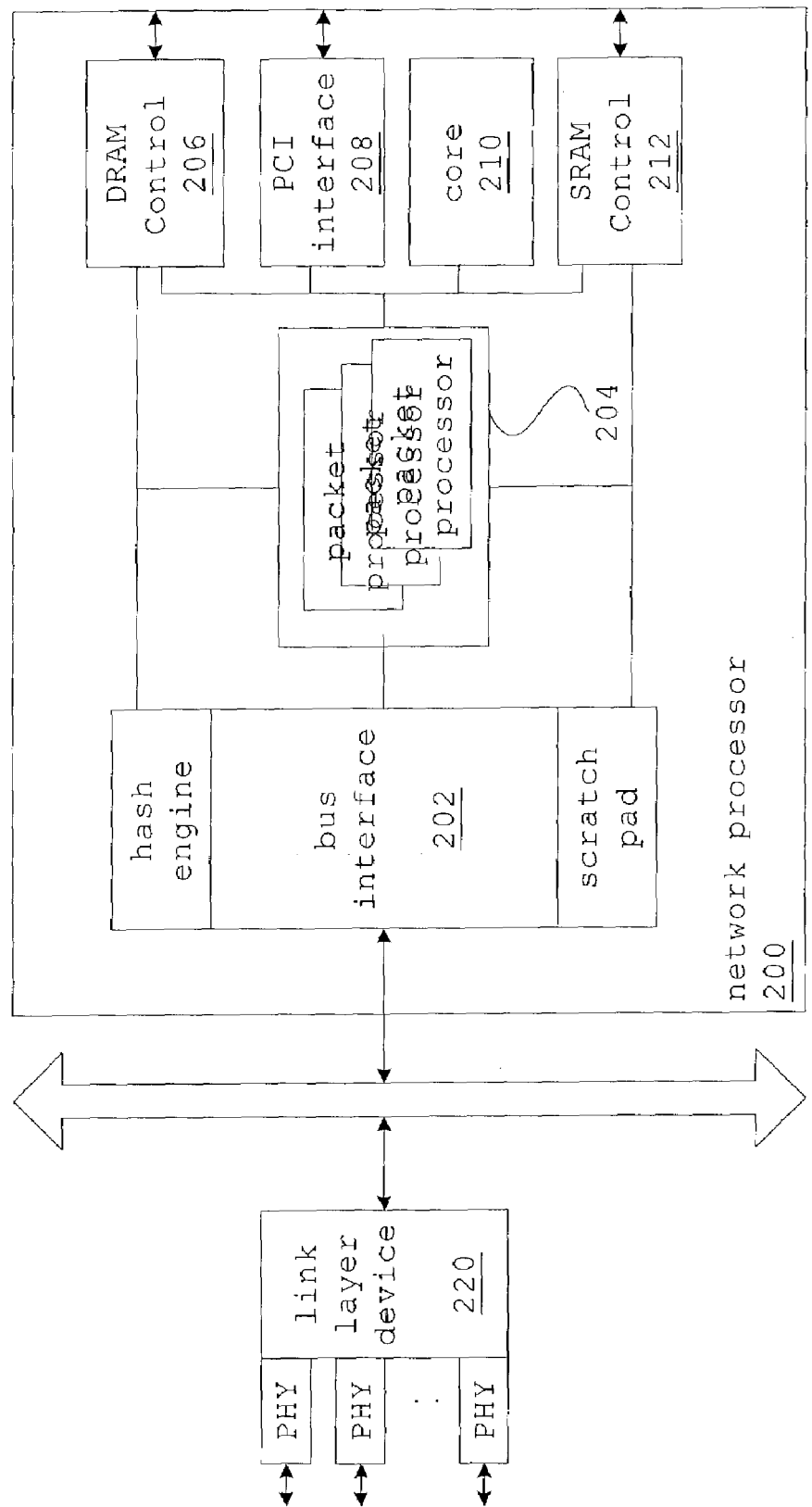
FIG. 4 is a diagram of a system that includes network processor.

The techniques may be used in a variety of environments. For example, a compiler may use these techniques in generating executable instructions for execution by a network processor. For example, FIG. 4 depicts a programmable network processor 200 that features multiple packet processors 204. The network processor 200 shown is an Intel® Internet eXchange network Processor (IXP). Other network processors feature different designs.

As shown, the network processor 200 features an interface 202 (e.g., an Internet eXchange bus interface) that can carries PDUs between the processor 200 and network components. For example, the bus may carry PDUs received via physical layer (PHY) components (e.g., wireless, optic, or copper PHYs) and link layer component(s) 222 (e.g., MACs and framers). The processor 200 also includes an interface 208 for communicating, for example, with a host. Such an interface may be a Peripheral Component Interconnect (PCI) bus interface. The processor 200 also includes other components such as memory controllers 206, 212, a hash engine, and scratch pad memory.

The network processor 200 shown features a collection of packet processors 204. The packet processors 204 may be Reduced Instruction Set Computing (RISC) processors tailored for network PDU processing. For example, the packet processors may not include floating point instructions or instructions for integer multiplication or division commonly provided by general purpose central processing units (CPUs).

An individual packet processor 204 may offer multiple threads. The multi-threading capability of the packet processors 204 is supported by hardware that reserves different registers for different threads and can quickly swap thread contexts. Instructions executed by a particular thread may be generated by a compiler using techniques described above.

The processor 200 also includes a core processor 210 (e.g., a StrongARM® XScale®) that is often programmed to perform "control plane" tasks involved in network operations. The core processor 210, however, may also handle "data plane" tasks and may provide additional packet processing threads.

As described above, the techniques may be implemented by a compiler. In addition to the compiler operations described above, the compiler may perform traditional compiler operations such as lexical analysis to group the text characters of source code into "tokens", syntax analysis that groups the tokens into grammatical phrases, semantic analysis that can check for source code errors, intermediate code generation (e.g., WHIRL) that more abstractly represents the source code, and optimization to improve the performance of the resulting code. The compiler may compile an object-oriented or procedural language such as a language that can be expressed in a Backus-Naur Form (BNF). Such a language may include instructions that support modular development of packet processing operations (e.g., "wiring" instructions that enable developers to chain the outputs of modules to the inputs of other modules).

The techniques may be implemented in hardware, software, or a combination of the two. For example, the techniques may be implemented by programs (e.g., a compiler or run-time system) disposed on a computer readable medium that include instructions for causing processor(s) to use technique described above.

Other embodiments are within the scope of the following claims.

What is claimed is:

1. A method comprising automatically, prior to execution of protocol data unit (PDU) processing instructions, merging different independent tables including PDU-related data into one merged table, generating a replacement query for a query to one of said independent tables, and caching data retrieved from the merged table, the method comprising:
    determining which data in said independent tables, among a plurality of candidate tables, to merge into a single monolithic combination table by examining table query instructions in said processing instructions, wherein the monolithic combination table associates a same lookup key with data in the candidate tables, the lookup key implemented as a flow identifier for contents of the PDUs being processed, the lookup key invoked via a lookup method that looks up a key value from said candidate tables;
    merging the data from a selection of data within said candidate tables into the single monolithic combination table, wherein the selecting includes determining whether candidate table data are compatible for merging according to compatibility criteria;
    compiling a replacement instruction based on the data merged in the single monolithic table, the compiling comprising:
    determining if a first query for data related to PDU in a first table is a query to data from a table merged into the single monolithic combination table formed from the data from multiple tables;
    generating a second query for the first query for data stored by the single monolithic combination table, the second query comprising instructions generated by a compiler in a target language other than the source language of the first query; and
    caching data retrieved from the single monolithic combination table in response to the second query.

2. The method of claim 1, wherein the compiler comprises a compiler that generates instructions for execution by at least one packet processor of a network processor.

3. The method of claim 1, wherein the generating comprises generating during run-time.

4. The method of claim 1, wherein the first query for data related to the protocol data unit comprises a query using a key based on data included in the protocol data unit.

5. The method of claim 4,
    wherein the protocol data unit comprises an Internet Protocol (IP) datagram that encapsulates a Transmission Control Protocol (TCP) segment; and
    wherein the key comprises a key based on the datagram's source address, the datagram's destination address, the datagram's source port, and the datagram's destination port.

6. The method of claim 1,
    further comprising identifying a third query, the third query being to a table merged into the combination table; and
    further comprising generating a fourth query for the third query that accesses the cached data retrieved from the combination table.

7. The method of claim 1, wherein the determining comprises determining based on analysis of source code.

8. The method of claim 1, wherein the determining comprises identifying tables accessed using the same key data.

9. The method of claim 1, wherein the determining whether the tables are compatibly accessed by different queries.

10. A compiler for generating target instructions from protocol data unit (PDU) processing source instructions, the compiler being operative to, prior to execution of the PDU processing instructions, merge different independent tables including PDU-related data into one merged table, generate a replacement query for a query to one of said independent tables, and cache data retrieved from the merged table, the compiler being disposed on a computer readable medium and including instructions for causing a processor to operate on the source instructions to:
    determine which data in different independent tables, among a plurality of candidate tables, to merge into a single monolithic combination table, the different independent tables including PDU-related data, wherein the monolithic combination table associates a same lookup key with data in the candidate tables, the lookup key implemented as a flow identifier for contents of the PDUs being processed, the lookup key invoked via a lookup method that looks up a key value from said candidate tables;
    merge the data from a selection of data within said candidate tables into the single monolithic combination table, wherein the selecting includes determining whether candidate table data are compatible for merging according to compatibility criteria;

compiling a replacement instruction based on the data merged in the single monolithic table, the compiling causing a processor to operate on the source instructions to:

determine if a first query for data related to the PDU in a first table is a query to date from a table merged into the single monolithic combination table formed from the data from multiple tables including the first table;

generate a second query for the first query for data stored by the single monolithic combination table, the second query comprising instructions generated by the compiler in a target language other than the source language of the first query; and cache data retrieved from the single monolithic combination table in response to the second query.

11. The compiler of claim 10, wherein the compiler generates instructions for execution by at least one packet processor of a network processor.

12. The compiler of claim 10, wherein the first query for data related to the protocol data unit comprises a query using a key based on data included in the protocol data unit.

13. The compiler of claim 12,
wherein the protocol data unit comprises an Internet Protocol (IP) datagram that encapsulates a Transmission Control Protocol (TCP) segment; and
wherein the key comprises a key based on the datagram's source address, the datagram's destination address, the datagram's source port, and the datagram's destination port.

14. The compiler of claim 10, further comprising instructions that generate instructions to access the cached data retrieved from the combination table for a query to a table merged into the combined table.

15. The compiler of claim 10, wherein the instructions to determine tables to merge comprise instructions to identify tables accessed using the same key data.

16. The compiler of claim 10, wherein the instructions to determine tables to merge comprises instructions to determine whether the tables are compatibly accessed by different queries.

17. A compiler for generating target instructions for execution by a packet processor of a network processor from protocol data unit (PDU) processing source instructions, the compiler being operative to, prior to execution of the PDU processing instructions, merge different independent tables including PDU-related data into one merged table, generate a replacement query for a query to one of said independent tables, and cache data retrieved from the merged table, the compiler being disposed on a computer readable medium and including instructions for causing a processor to operate on the source instructions to:

determine which data in different independent tables, among a plurality of candidate tables, to merge into a single monolithic combination table, the different independent tables including PDU-related data, the determining based, at least in part, on identification of table queries using the same key data, wherein the monolithic combination table associates a same lookup key with data in the candidate tables, the lookup key implemented as a flow identifier for contents of the PDUs being processed, the lookup key invoked via a lookup method that looks up a key value from said candidate tables;

merge the data from a selection of data within said candidate tables into the single monolithic combination table, wherein the selecting includes determining whether candidate table data are compatible for merging according to compatibility criteria;

compile a replacement instruction based on the data merged in the single monolithic table, the compiling causing a processor to operate on the source instructions to:

determine if a first query for data related to the PDU in a first table is a query to date from a table included in the single monolithic combination table; and generate a replacement query for the first query, the replacement query for data stored by the single monolithic combination table, the replacement query comprising instructions generated by the compiler in a target language other than the source language of the first query;

one or more instructions that cache data retrieved from the single monolithic combination table in response to the replacement query; and instructions to access the cached data retrieved from the single monolithic combination table for a subsequent query to date from a table merged into the single monolithic combined table.

18. The compiler of claim 17, wherein the network processor comprises a processor having multiple packet processors offering multiple threads of execution.

* * * * *